United States Patent [19]

Kinase et al.

[11] 4,089,178
[45] May 16, 1978

[54] APPARATUS FOR DEPLOYING AND TAKING UP AN OIL FENCE

[75] Inventors: Takeo Kinase; Isamu Yano; Kanichi Okubo; Hidetoshi Kitakoga; Hiromitsu Tayama, all of Sagamihara, Japan

[73] Assignee: Mitsubishi Denki Kabushiki Kaisha, Japan

[21] Appl. No.: 587,871

[22] Filed: Jun. 18, 1975

Related U.S. Application Data

[63] Continuation of Ser. No. 443,131, Feb. 15, 1974, Pat. No. 3,971,220.

[30] Foreign Application Priority Data

Feb. 23, 1973 Japan .............................. 48-23420[U]
Aug. 30, 1973 Japan ............................ 48-101721[U]
Dec. 12, 1973 Japan ............................ 48-144152[U]

[51] Int. Cl.² .......................................... E02B 15/04
[52] U.S. Cl. .............................. 61/1 F; 210/DIG. 25; 114/270
[58] Field of Search ......... 61/1 F; 210/242, DIG. 21; 114/.5 R

[56] References Cited

U.S. PATENT DOCUMENTS

| | | | |
|---|---|---|---|
| 3,563,036 | 2/1971 | Smith et al. | 61/1 F |
| 3,613,377 | 10/1971 | Zaugg | 61/1 F |
| 3,664,504 | 5/1972 | Ayers et al. | 210/DIG. 21 |
| 3,748,264 | 7/1973 | McCombie | 210/DIG. 21 |

*Primary Examiner*—Paul R. Gilliam
*Assistant Examiner*—David H. Corbin
*Attorney, Agent, or Firm*—Robert E. Burns; Emmanuel J. Lobato; Bruce L. Adams

[57] ABSTRACT

An apparatus for deploying and taking up an oil fence comprises a floating framework having a substantially enclosed oil fence receiving space therein and one side partly cut away and, roll means disposed in front of the cut-away portion. The roll means can be driven to sinuously house the oil fence within the framework and to pay it out from the latter. Alternatively, a takeup shaft disposed in a box-shaped member with buoyant chambers and fenders may be driven to coil and uncoil the oil fence on and from it through one open side of the box-shaped member.

2 Claims, 19 Drawing Figures

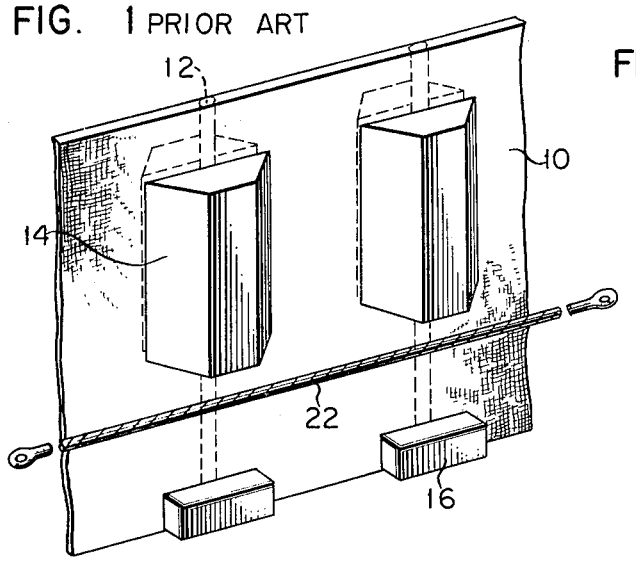
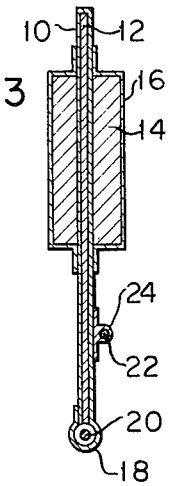
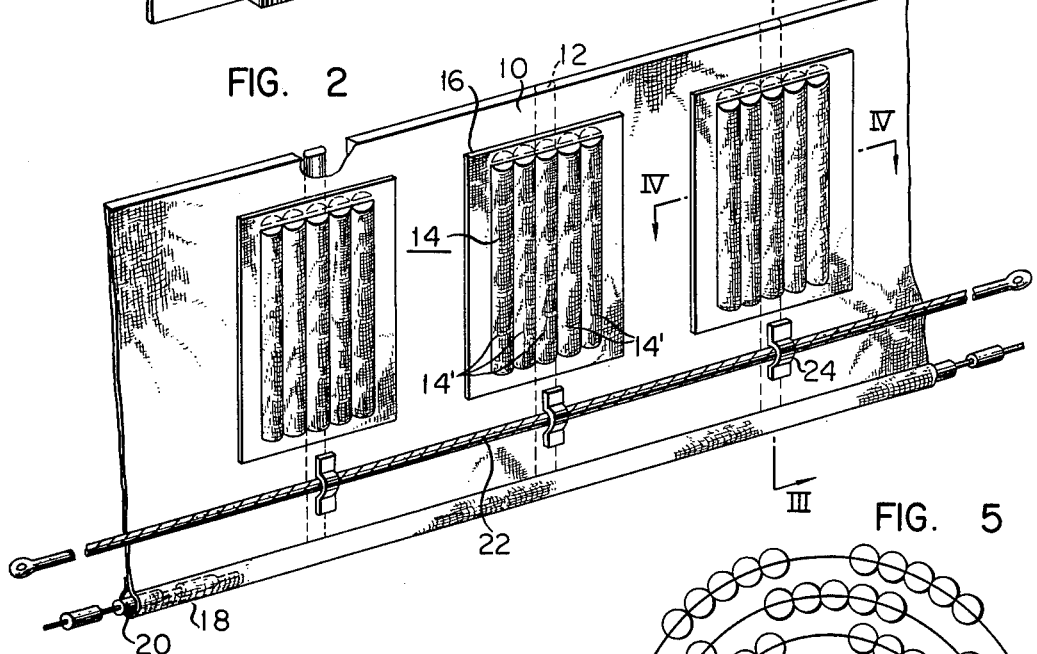
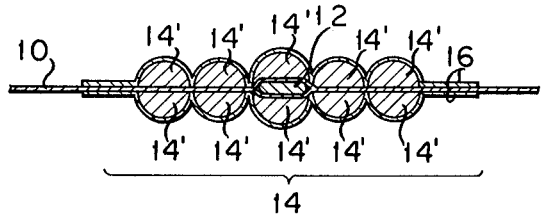
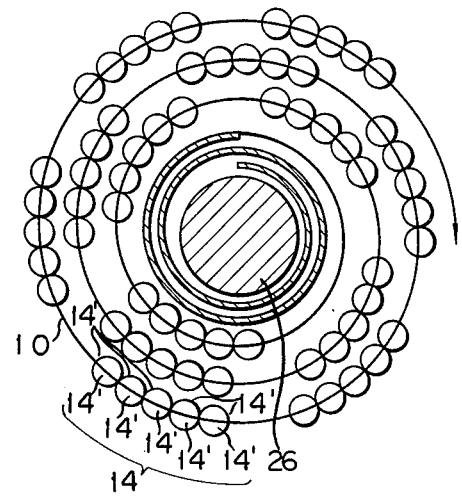

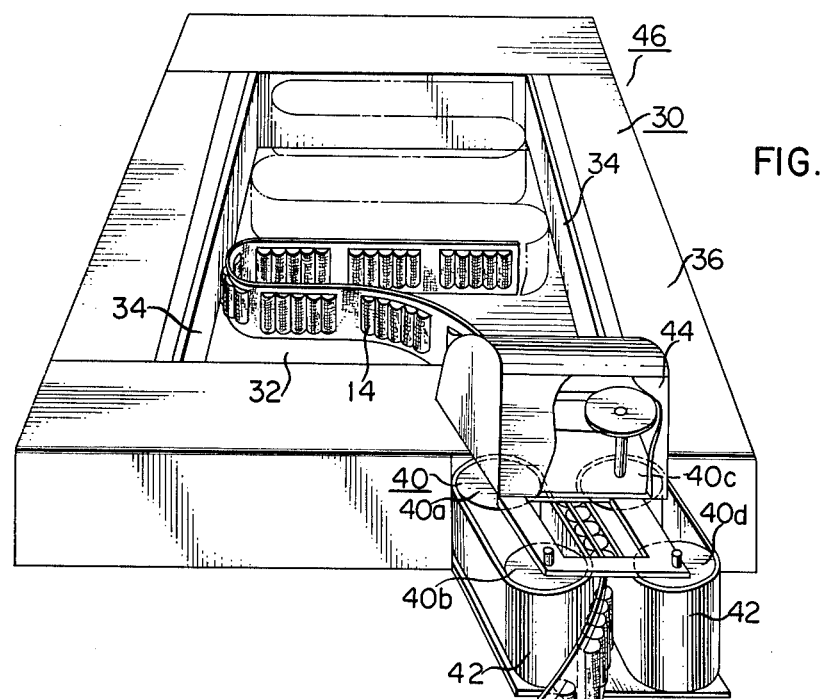
FIG. 6
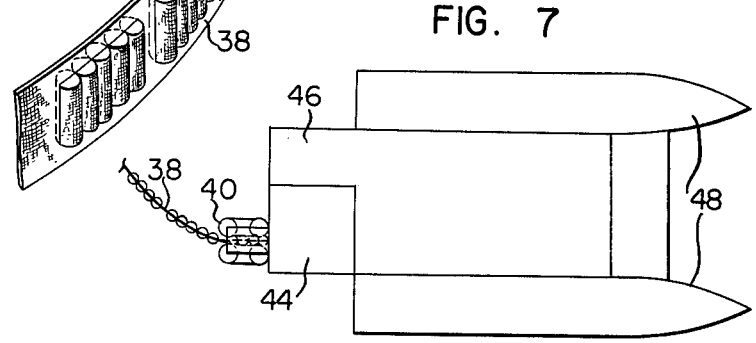
FIG. 7
FIG. 8
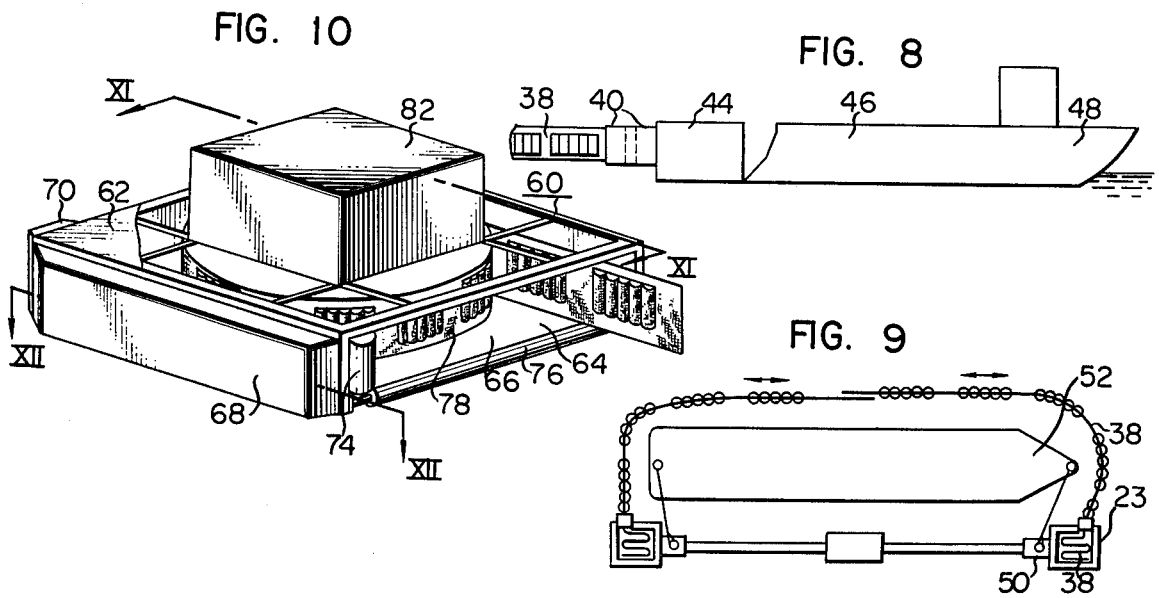
FIG. 10
FIG. 9

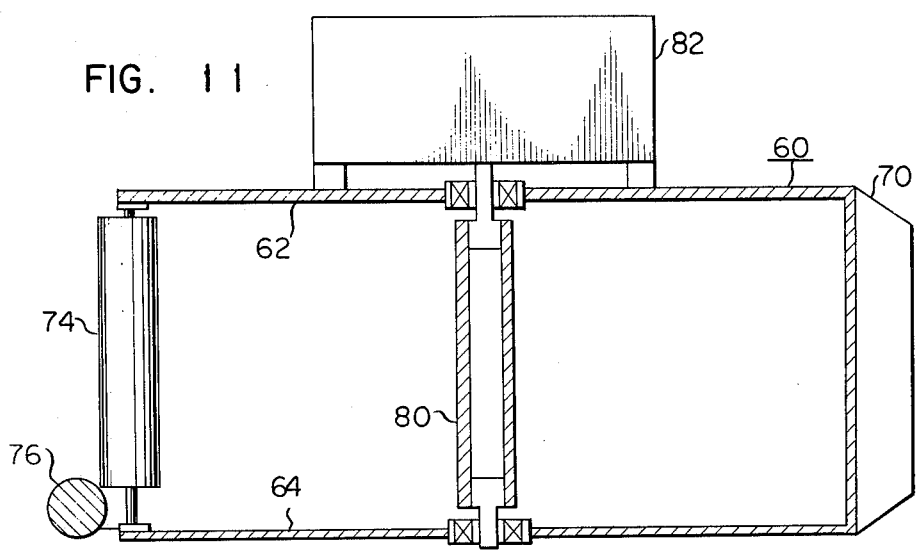
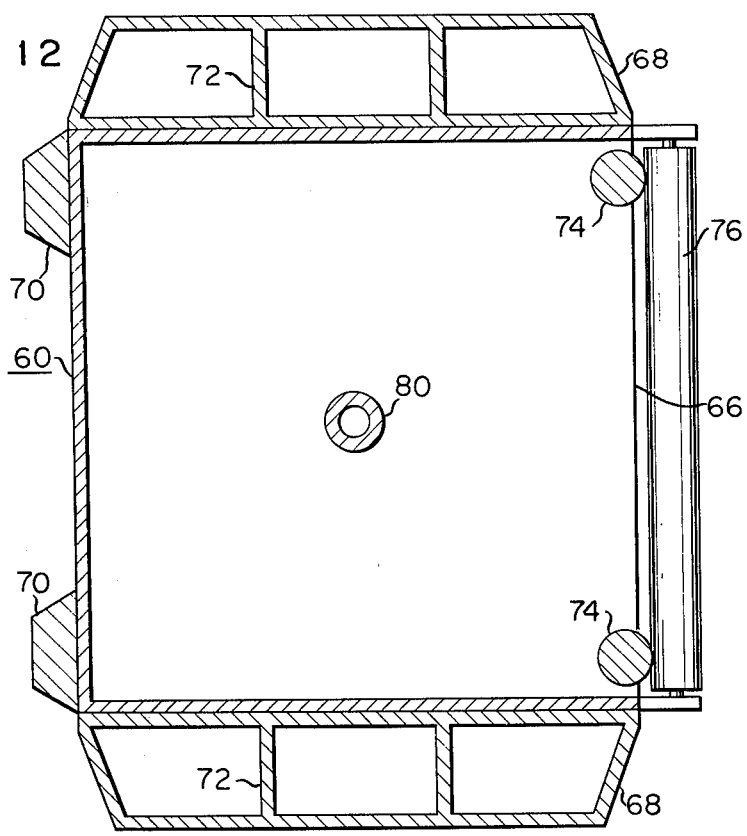
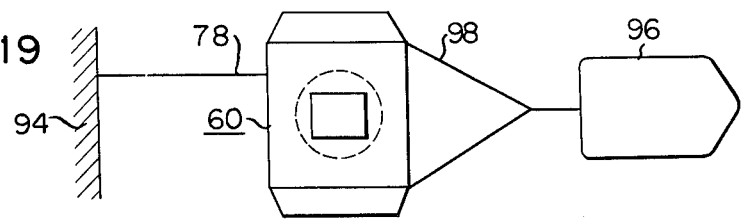

APPARATUS FOR DEPLOYING AND TAKING UP AN OIL FENCE

This is a divisional of application Ser. No. 443,131, filed Feb. 15, 1974 now U.S. Pat. No. 3,971,220.

BACKGROUND OF THE INVENTION

This invention relates to an apparatus for deploying and taking up an oil fence.

Oil fences have been recently put to practical use to collect and restore oil spilled on the sea and in harbors during the navigation of ships and upon failures thereof in order to minimize public nuisances resulting from the spilling of the oil. Conventional oil fences have comprised the shielding screen member, a plurality of reinforcing strips disposed in spaced parallel relationship on the screen member and widthwise thereof, one float secured to each of the reinforcing strips, one sinker attached to one end of each strip and a length of reinforcing rope extending throughout the length of the screen member to cross the reinforcing strips. Such a construction of oil fences has not only occupied a large space required to be housed during non-service because of the presence of the bulk floats but also lacked the rapidity in spreading the oil fences. This has resulted from the fact that there is no choice but to fold sinuously the fences for housing. In addition, it has been extremely difficult to spread and withdraw oil fences because of considerable lengths, thereof. It is very desirable to provide means for winding and unwinding oil fences into and from coils.

SUMMARY OF THE INVENTION

It is an object of the present invention to provide a new and improved apparatus for deploying and taking up an oil fence for housing and spreading it in a simple manner with a high effeciency.

The apparatus for deploying and taking up an oil fence of the present invention comprises, in combination, a floating framework having side walls defining a substantially enclosed inner oil fence receiving space in which an oil fence is to be stored with its width vertical. One side of the framework is partly cut away to provide an opening for deploying and taking up therethrough the oil fence into and out from the enclosed oil fence receiving space. A guide comprised of rollers is disposed at the opening with the axes of the rollers vertical so that the width of the oil fence being deployed or taken up is always vertical.

Another embodiment of the invention comprises a buoyant framework having a front side open to take the oil fence in and out from a substantially enclosed inner oil fence receiving space therethrough, buoyant chambers attached to bilateral sides thereof, and a vertical takeup shaft centrally disposed within the buoyant framework to take up the oil fence thereon with its width vertical.

BRIEF DESCRIPTION OF THE DRAWINGS

The present invention will become more readily apparent from the following detailed description taken in conjunction with the accompanying drawings in which:

FIG. 1 is a fragmental perspective view of an oil fence constructed in accordance with the principles of the prior art;

FIG. 2 is a fragmental perspective view of an oil fence constructed in accordance with the principles of the present invention;

FIG. 3 is an enlarged cross sectional view as taken along the line III—III of FIG. 2;

FIG. 4 is an enlarged sectional view of the float unit shown in FIG. 2 with the section taken along the line IV—IV of FIG. 2;

FIG. 5 is a plan view of the oil fence shown in FIGS. 2 through 4 and wound into a spiral coil for housing;

FIG. 6 is a perspective view of an apparatus for taking up an oil fence, constructed in accordance with the principles of the present invention.

FIG. 7 is a schematic plan view of a twin hull boat towing the takeup apparatus shown in FIG. 6;

FIG. 8 is a side elevational view of the twin hull boat shown in FIG. 7;

FIG. 9 is a diagrammatic plan view illustrating the manner in which a pair of takeup apparatus shown in FIG. 6 are in operation in a harbor while they are moored at dolphins;

FIG. 10 is a perspective view of another takeup apparatus constructed in accordance with the principles of the present invention, with parts broken away to illustrate the internal construction;

FIG. 11 is a vertical sectional view of the takeup apparatus shown in FIG. 10 with the section taken along the line XI—XI of FIG. 10;

FIG. 12 is a horizontal sectional view of the takeup apparatus shown in FIG. 10 with the section taken along the line XII—XII of FIG. 10;

FIGS. 13 through 18 are diagrammatic views illustrating different manners in which the takeup apparatus shown in FIGS. 10, 11 and 12 is moored to stationary members wherein FIGS. 13, 15 and 17 are plan views and FIGS. 14, 16 and 18 are elevational views of FIGS. 13, 15 and 17 respectively; and FIG. 19 is a diagrammatic view illustrating the manner in which a ship is towing the takeup apparatus shown in FIGS. 10, 13 and 14.

DESCRIPTION OF THE PREFERRED EMBODIMENTS

Figure 13:
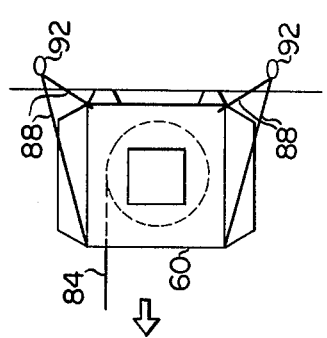

Referring now to the drawings and FIG. 1 in particular, there is illustrated a conventional oil fence. The arrangement illustrated comprises a longitudinally elongated, shielding screen member 10, a plurality of reinforcing strips 12 disposed in spaced parallel relationship on the screen member 10 to traverse the latter, one pair of opposite floats 14 disposed on both surfaces of screen member 10 about each of the reinforcing strips 12, and one sinker 16 attached to one end of each strip 12 at one edge, in this case, a lower edge as viewed in FIG. 1 of one surface of the screen member 10. Then a length of reinforcing rope 22 is longitudinally disposed on the one surface of the screen member 10 between the floats and sinkers 14 and 16 respectively and has both eyed end portions projecting beyond both ends of the screen member 10.

It is generally required to fold up oil fences as small as possible in their unused position and also to be able to be rapidly spread into their operative position. Conventional oil fences as shown in FIG. 1 have occupied large spaces required to be housed when not used. This is because the associated floats are bulky. Also the oil fences have lacked the rapidity in spreading the same for the reason that the only method of housing the oil fences is to fold them in a sinuous manner. Although there have been known oil fences having floats disposed thereon in parallel relationship with the longitudinal axis thereof, such oil fences have been more inconvenient to be housed. It is very desirable and has been long requested in the art to provide wound type oil fences in order to facilitate their housing and spreading.

On the other hand, oil fences are considerably long, for example, of from 300 to 5000 meters and therefore it has been extremely difficult to spread and withdraw the oil fences. For example, if an oil fence is to be spread on the sea from a ship or a shore then several persons have previously performed the paying-out operation because a suitable equipment therefor does not exist. This has been accompanied by both danger that at least some of the operators may be pulled down into the sea because the oil fence has a weight as heavy as from 5 to 15 kilograms per meter and a low efficiency with which the operation is performed. This is also true in the case of the operation of withdrawing the oil fence.

In order to meet the request for providing wound type oil fences as above described and also to eliminate the objections to the conventional oil fences just described, the applicants designed and constructed an apparatus for taking up oil fences on a drum after the repetition of methods of trial and error. The designed apparatus comprised a frame adapted to be attached to a quay or a ship's side, a shaft vertically fitted into a pair of bearings disposed at both end plates of the frame, a mechanism for applying a driving force to the head of the shaft, a drum slidably fitted onto the shaft to engage the shaft through a key, a float secured to the lower portion of the drum and a flange secured to the upper portion of the drum whereby an oil fence can be taken up on the drum. The results of experiments indicated the following deficiencies:

(1) There was a fear that grains of sand and floating matters might enter the slidable portion between the shaft and the drum and eventually the sliding movement therebetween might be inhibited. This was because the slidable portion was immersed in the sea;

(2) Since the slidable portion could not have a low coefficient of friction, it was difficult for the drum to follow the movement of waves; and (3) The shaft was required to be long enough to be adapted to the tide and a change in the surface of the sea caused from waves resulting in a large-sized construction. Also an increase in the length of the shaft caused an increase in the bending moment of the shaft leading to the necessity of increasing the diameter thereof.

The present invention contemplates to eliminate those deficiencies.

Referring now to FIG. 2, there is illustrated an oil fence which can be suitably used with the apparatus of the present invention. The arrangement illustrated comprises a shielding screen member 10 of any suitable flexible material such as a rubber coated cloth or synthetic-resin coated cloth which is water impervious, and a plurality of reinforcing strips 12 disposed at predetermined equal intervals on the screen member to traverse of the latter. In FIG. 2 a part of the screen member 10 is shown as being spread. The reinforcing strips 12 are formed of any suitable rigid material and are coextensive with the width of the screen member 10. As best shown in FIG. 4, each of the reinforcing strips 12 is snugly fitted, for example, into one elongated pouch extending through the width of the screen member 10 at its position where the strip is to be disposed and complementary in shape to the same.

Then a plurality of float units in the form of rectangles generally designated by the reference numeral 14 are disposed at predetermined equal intervals on the screen member 10 so as to equidistantly extend from the lengthwise axes of the respective reinforcing strips 12 on both sides and to be relatively biased toward one of the longitudinal edges, in this case, the upper edge as viewed in FIG. 2 of the screen member 10. More specifically, each of the float units 14 is of a split type and includes an array of elongated semicylindrical floats 14' disposed side by side and about the lengthwise axis of the associated strip 12 on each surface of the screen member 10 to form minute gaps therebetween. The flat surface of the individual semicylindrical floats 14' of the array on each surface of the screen member 10 oppose those of the array on the other surface thereof to sandwich the adjacent screen portions therebetween except for the central floats 14' of both arrays sandwiching the mating strip 12 therebetween through the screen portion encircling the latter (see FIG. 4). The floats 14' may be of any suitable foamed resin or a hollow semicylinder made of any suitable rigid material. A sheet-like member or covering 16 formed of a rubber coated cloth or a synthetic-resin coated cloth is applied to both the exposed surfaces of the individual floats 14' of each float unit 14 and the gaps therebetween and also to that portion of the screen member 10 adjacent to the periphery of the float unit 14 as by hot pressing.

The screen member 10 has the other or lower edge shaped into a loop 18 extending along the length thereof and a chain-shaped sinker 20 loosely extends through the loop 18. A reinforcing member comprised of a length of reinforcing rope 22 formed of a wire rope or a synthetic resin rope is disposed on the screen member 10 between the looped edge thereof and the adjacent sides of the float units 14 by having patches 24 fixing the same to the screen member 10 at preselected positions. The length of rope 22 has both eyed ends.

The float units and sinker 14 and 20 respectively are designed and arranged such that, with the oil fence spread out on the sea to be extended lengthwise the oil fence vertically floats on the sea with the upper half thereof exposed above the sea while the lower half thereof sinks under the sea. Since the oil fence as above described has a predetermined fixed length, the required number thereof can be lengthwise interconnected by joints (not shown) and spread out on the sea thereby to encircle and collect heavy oil or the like spilled on the sea.

In each of the float units 14, a border between each pair of adjacent floats 14' has applied thereto the flexible cloth serving as a hinge. Therefore the float units can be bent about the borders widthwise of the screen member 10. This permits the oil fence to be spirally wound on a drum or a shaft 26 for housing (see FIG. 5).

As above described, the oil fence includes the float units each divided into small individual floats. This results in an oil fence easy in both manufacturing and setting up. Also those portions of the shielding screen member covered by the float units total a wide area resulting in a high resistance to a side wind. Further, the oil fence can readily be housed in place because it can be spirally wound on a drum or a shaft. In addition, the oil fence can be readily spread because it is required only to be unwound from the drum or shaft.

Referring now to FIG. 6, there is shown an apparatus for deploying and taking up a flexible oil fence as above described, for example. The arrangement illustrated comprises a floating framework generally designated by the reference numeral 30 and formed into a square cross section of hollow frame members or a bouyant material.

The framework 30 includes a pool 32 defined by four inner lateral wall surfaces 34 and a closed bottom and having an open top defined by four upper wall surface 36 thus forming a laterally enclosed inner oil fence receiving space therein. The inner lateral and upper wall surfaces 34 and 36 respectively may be suitably reinforced with sheet iron for the particular application.

As shown in FIG. 6, the framework 30 is provided on any one of the lateral walls or sidewalls, in this case, the lateral wall toward the viewer with an opening by partly cutting away that wall. In the embodiment illustrated in FIG. 6 the sidewalls are buoyant box-like members. A flexible oil fence 38 such as above described in conjunction with FIGS. 2 through 5 is permitted to be entered into and carried out from the pool or oil fence receiving space 32 through the opening. Disposed in front of the opening, is roll means or guide means generally designated by the reference numeral 40 and including two pair of opposite rolls 40a, 40c and 40b, 40d disposed in tandem relationship and a pair of endless broad belts 42 spanned across the rolls 40a and 40b and across the rolls 40c and 40d. The spacing between the adjacent portions of the two belts 42 preferably has a distance sufficient to just sandwich the oil fence 38 and maintain frictional contact therebetween in order to improve the system efficiency. The guide means 40 can be forwardly and reversely driven by an electric reversible motor (not shown) included in a driving device or drive means 44 disposed on that portion of the upper surface 36 adjacent the guide means 40.

In operation, the reversible motor in the driving device 44 can be driven in one direction with the guide means 40 sandwiching one end of the oil fence 38 payed out externally of the arrangement of FIG. 6 generally designated by the reference numeral 46. Thereby the oil fence 38 is payed into the oil fence receiving space or pool 32 through the guide means 40. In the pool 32, the oil fence is slowly folded in a sinuous manner until it is bundled in that manner. On the contrary, if the oil fence 38 is desired to be payed out, the reversible motor is driven in the opposite direction to pull the oil fence out from the pool 32.

As shown in FIGS. 7 and 8, the arrangement 46 may be connected to a twin hull boat 48 to be moved to any desired place on the sea.

Alternatively, as shown in FIG. 9, the arrangement 46 or the housing apparatus may be moored to each of two dolphins 50 to pay the oil fences 38 out in the associated harbor to prevent escaped oil from further spreading and also to pay them into the apparatus 46 to prevent the spread oil fences 38 from interfering with the navigation of a ship 52.

From the foregoing it will be appreciated that the housing apparatus according to the present invention is advantageous in that the oil fence 38 can be payed out and in while the apparatus 46 is floating on the sea. This results in the safe and rapid operation. Further, the present apparatus can be moored at and moved to any desired position on the sea and also sufficiently house a long oil fence.

The present invention further contemplates to provide an apparatus for taking up a flexible oil fence having the following advantages:

(1) The entire apparatus is carried on the surface of the sea by means of a float;

(2) The apparatus is fixed to a quay, a dolphin or dolphins or an anchor or anchors through a length or lengths of rope, chain or the like;

(3) The oil fence receiving space formed in the framework is substantially enclosed by the side walls;

(4) The oil fence is stored in the receiving space with its width vertical;

(5) Guide means is disposed at an opening of the side wall for guiding the oil fence.

As a result, the following effects has been exhibited:

(1) The necessity of forming a slidable portion between the shaft and the takeup drum has been eliminated;

(2) The shaft is sufficient to have a length somewhat greater than that of the takeup drum resulting in a decrease in the diameter of the shaft;

(3) The apparatus can be towed to its destination with the oil fence maintained wound up on the drum;

(4) The apparatus has a good response to waves and can well follow a great change in the sea level;

(5) The oil fence stored in the oil fence receiving space is protected;

(6) The oil fence is not twisted when it is being advanced through the opening; and (7) A smooth advancement through the opening is ensured.

FIGS. 10 through 12 show a takeup apparatus exhibiting the effects just described. The arrangement illustrated comprises a square box-shaped member generally designated by the reference numeral 60 and including a top plate 62, a bottom plate 64, three side plates and an rectangular opening 66 formed on the remaining side or front side. As best shown in FIG. 12, the frame or box-shaped member 60 has externally attached to the bilateral side plates a pair of buoyant chambers 68 symmetrical to each other and also externally attached to that side plate opposite to the opening 66 or the rear side a plurality, in this case, two of spaced fenders 70. The buoyant chambers 68 serve to cause the box-shaped member 60 to float on the surface of the sea and the fenders 70 serve to decrease a force with which the box-shaped member 60 may strike against the adjacent quay or ship by means of the action of waves. The buoyant chamber 68 can be divided into a plurality of compartments by partition 72 as shown in FIG. 12. This measure is effective for reducing risks due to damages to the buoyant chambers.

As best shown in FIG. 12, the opening 66 has a pair of vertical guide rollers 74 bilaterally disposed at both ends thereof and a horizontal guide roller 76 disposed on the lower side thereof across the vertical guide rollers 74. Those rollers 74 and 76 are effective for minimizing or substantially removing a friction occurring between the opening 66 and a flexible oil fence 78 as passed through the opening 66.

As shown in FIG. 11, a takeup shaft 80 is centrally disposed within the box-shaped member 60. That is, the takeup shaft 80 is rotatably supported at both ends to the top and bottom plates 62 and 64 respectively, through individual bearings.

Disposed upon the top plate 62 is a driving device 82 including, for example, an electric reversible motor (not shown) for driving the takeup shaft 80 through transmission means (not shown) well known in the art.

It is assumed that the oil fence 78 is the oil fence as above described in conjunction with FIGS. 2 through 5. It is also assumed that the oil fence 78 has one end portion fastened round the takeup shaft 80 by any suitable means. Oil fences have usually one end provided with a length of pull rope (not shown) so that such a length of pull rope can be fastened round the shaft 80 as shown by a few turns of hatched coiled portion around the drum 26 in FIG. 5.

In operation, the reversible motor (not shown) included in the driving device 82 is driven in one direction to rotate the takeup shaft 80 in a corresponding direction of paying out the oil fence. This causes the oil fence 78 wound on the shaft 80 to be payed out over both at least one of the vertical guide rollers 74 and the horizontal guide roller 76. Then the oil fence 78 is spread on the sea while the upper half thereof is exposed above the surface of the sea and the lower half thereof is immersed in the sea.

In order to take up the spread oil fence 78 on the takeup shaft, the reversible motor (not shown) can be driven in the opposite direction. At that time, the oil fence 78 spread on the sea is vertically moved as the surface of the sea is vertically moved. Under these circumstances, the box-shaped member 60 is also vertically moved on the surface of the sea to the same extent as the oil fence 78 being taken up. Therefore the oil fence 78 can be taken up on the shaft 80 without hindrance.

Figure 14:
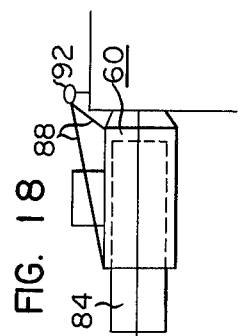
Figure 15:
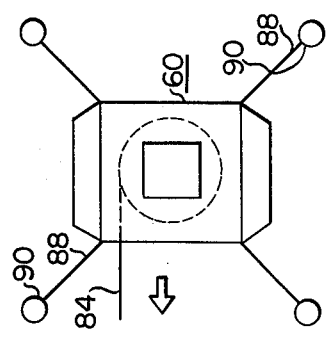
Figure 16:
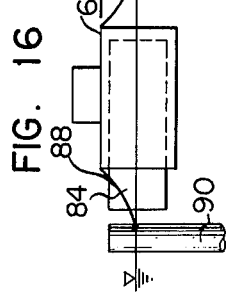
Figure 17:
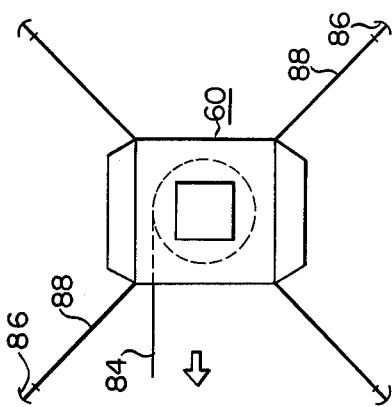
Figure 18:
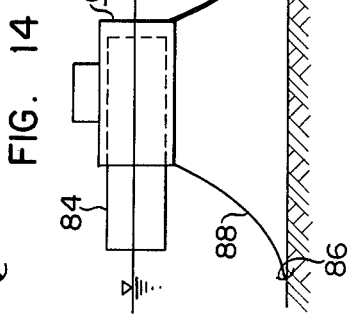

The box-shaped member 60 can be moored in different manners. For example, the box-shaped member 60 floating on the surface of the sea 84 can be moored at four anchors 86 disposed at the bottom of sea at four corners of a square through respective mooring lines 84 connected between the anchors 82 and the adjacent corners of the box-shaped member 60 as shown in FIGS. 13 and 14. FIGS. 15 and 16 show the box-shaped member 60 moored at stakes 90 in the similar manner as illustrated in FIGS. 13 and 14 and maintained floating on the surface of the sea 84. In FIGS. 17 and 18 the box-shaped member 60 is shown as being moored at a pair of dolphins 92 on a quay through two pairs of mooring lines 88 each pair connecting one dolphin 92 to the adjacent corners of the same on each side thereof and maintained floating on the surface of the sea 84. In FIGS. 13, 15 and 17, the arrow indicates a direction in which the floating oil fence 78 is spread on the sea.

As shown in FIG. 19 the oil fence 78 having one end connected to a quay 94 can be spread on the sea while a ship travels to tow the box-shaped member 60 through two tow lines 98.

While the present invention has been illustrated and described in conjunction with a few preferred embodiments thereof it is to be understood that numerous changes and modifications may be resorted to without departing from the spirit and scope of the present invention.

What we claim is:

1. An apparatus for deploying and taking up an oil fence, comprising:
    buoyant side walls jointly comprising a buoyant frame having an interior oil fence receiving space for storing therein an elongated flexible buoyant oil fence having a major width dimension and a minor thickness dimension and which floats with its width dimension generally vertical when deployed in use in water, said buoyant side walls defining a lateral periphery of the oil fence receiving space and extending around the periphery of the oil fence receiving space for protecting the oil fence when it is stored within the oil fence receiving space, said buoyant side walls having a height greater than the width dimension of the oil fence to permit storage of the oil fence with its width dimension vertical, one of said buoyant side walls having an opening therethrough dimensioned to permit the oil fence to be advanced therethrough with its width dimension vertical for deploying it from and taking it up into the oil fence receiving space in use, and said buoyant further comprising a bottom plate-like member attached to said side walls and defining a lower periphery of the oil fence receiving space; and
    guide means mounted on said one of said buoyant side walls proximate the opening through said one of said buoyant side walls for guiding the oil fence and for maintaining its width dimension vertical as it is deployed and taken up through the opening, wherein said guide means comprises;
    a first pair of spaced rollers having respective parallel axes of rotation, and a first taut endless belt wound about a respective surface portion of each of the rollers and spanning the space between the first pair of rollers so that rotation of one of the rollers of the first pair advances the first belt and rotates the other roller of the first pair of rollers;
    a second pair of spaced rollers having respective parallel axes of rotation, and a second taut endless belt wound about a respective surface portion of each of the rollers of the second pair and spanning the space between the second rollers so that the rotation of one of the rollers of the second pair advances the second belt and rotates the other roller of the second pair of rollers; and
    means mounting said first pair and second pair of rollers with their respective axes of rotation vertical and with their respective belts opposed and spaced to define therebetween a narrow vertical opening for receiving the oil fence with its width dimension vertical and with the oil fence sandwiched between the respective belts and making frictional contact therewith, whereby rotation of one of said rollers advances a respective one of said belts which thereby advances the oil fence between the pair of opposed belts when it is in frictional contact therewith.

2. An apparatus for deploying and taking up an oil fence, comprising:
    buoyant side walls jointly comprising a buoyant frame having an interior oil fence receiving space for storing therein an elongated flexible buoyant oil fence having a major width dimension and a minor thickness dimension and which floats with its width dimension generally vertical when deployed in use in water, said buoyant side walls defining a lateral periphery of the oil fence receiving space and extending around the periphery of the oil fence receiving space for protecting the oil fence when it is stored within the oil fence receiving space, said buoyant side walls having a height greater than the width dimension of the oil fence to permit storage of the oil fence with its width dimension vertical, one of said buoyant side walls having an opening therethrough dimensioned to permit the oil fence to be advanced therethrough with its width dimension vertical for deploying it from and taking it up into the oil fence receiving space in use, and said buoyant frame further comprising a bottom plate-like member attached to said side walls and defining a lower periphery of the oil fence receiving space; and guide means mounted on said one of said buoyant side walls proximate the opening through said one of said buoyant side walls for guiding the oil fence and for maintaining its width dimension vertical as it is deployed and taken up through the opening, wherein said guide means comprises;

a pair of opposed rollers mounted on said one side wall for rotation proximate the opening through said one side wall and having parallel axes of rotation extending vertically and sufficiently spaced to clear therebetween the oil fence with its width dimension vertical as the oil fence advances through the opening through said one buoyant side wall and between said pair of opposed rollers; and a third roller mounted on said one side wall for rotation proximate the opening through said one buoyant side wall and having an axis of rotation extending horizontally and being disposed between said pair of opposed rollers and along a bottom of the opening through said one buoyant side, whereby the oil fence will smoothly pass over any of the rollers which it may contact as it is advanced through the opening.

* * * * *